(12) United States Patent
Crocker

(10) Patent No.: US 8,576,657 B1
(45) Date of Patent: Nov. 5, 2013

(54) METHOD FOR CALIBRATING A PLURALITY OF DATA CHANNELS IN A VECTOR SENSOR

(75) Inventor: Steven E. Crocker, Bristol, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 119 days.

(21) Appl. No.: 13/200,832

(22) Filed: Sep. 29, 2011

Related U.S. Application Data

(62) Division of application No. 13/200,035, filed on Sep. 7, 2011.

(51) Int. Cl.
*H04B 17/00* (2006.01)

(52) U.S. Cl.
USPC .......................................................... 367/13

(58) Field of Classification Search
USPC .......................................................... 367/13
See application file for complete search history.

(56) References Cited

U.S. PATENT DOCUMENTS 6,208,584 B1 * 3/2001 Skinner ........................... 367/13

* cited by examiner

*Primary Examiner* — Isam Alsomiri
*Assistant Examiner* — Daniel L Murphy
(74) *Attorney, Agent, or Firm* — James M. Kasischke; Michael P. Stanley

(57) ABSTRACT

A system, processor and method of use for calibration processing is provided to calibrate acoustic vector sensor data collected at comparatively close range. Vector sensor data collected at close range includes data collected with source-to-receiver separations ranging from a one-tenth to approximately two acoustic wavelengths. The calculations substantially account for the acoustic impedance of a spherically diverging wave front, where the curvature is sufficiently pronounced to cause errors in resulting measurements in the calculations. The processing uses information contained within the vector sensor data to increase the accuracy of the vector sensor data.

3 Claims, 7 Drawing Sheets

US 8,576,657 B1

METHOD FOR CALIBRATING A PLURALITY OF DATA CHANNELS IN A VECTOR SENSOR

This application is a divisional of pending prior U.S. patent application Ser. No. 13/200,035 filed on Sep. 7, 2011 entitled "A SYSTEM FOR SELF-LOCALIZING NEAR DATA FIELD PROCESSING" by the inventor, Steven E. Crocker. This divisional application claims the benefit under 35 U.S.C. §121 of the prior application's filing date.

STATEMENT OF GOVERNMENT INTEREST

The invention described herein may be manufactured and used by or for the Government of the United States of America for governmental purposes without, the payment of any royalties thereon or therefor.

CROSS REFERENCE TO OTHER PATENT APPLICATIONS

None.

BACKGROUND OF THE INVENTION (1) Field of the Invention

The present invention relates to correcting an estimated range of a source-to-sensor distance in response to a range difference error that is determined by comparing and processing data collected in a near field (or otherwise) from a sensor and from a reference.

(2) Description of the Prior Art

Often, equipment such as hydrophones are tested and calibrated during the manufacturing and operational phases of the life cycle of the equipment. As such, test equipment for hydrophone applications is arranged in various locations relative to the units of the equipment undergoing testing. Common difficulties encountered while performing the tests include measuring the various distances between and amongst acoustic sources and reference hydrophones and the units under test. Errors in measurement of the distance affect the accuracy of the measurements made, and thus degrade equipment performance when the equipment is not optimally calibrated. Furthermore, relative motion among the acoustic source, reference hydrophone and the unit under test affects the accuracy of the measurements made.

SUMMARY OF THE INVENTION

Accordingly, it is a primary object and general purpose of the present invention to increase the accuracy of empirical measurements.

It is a further object of the present invention to provide an efficient method for using information contained within empirical measurements to increase the accuracy of the empirical measurements.

In accordance with the present invention, calibration processing is used to calibrate acoustic vector sensor data collected at close range. For example, vector sensor data (collected at close range) includes data collected with source-to-receiver separations ranging from one-tenth to approximately two acoustic wavelengths. The calculations substantially account for the acoustic impedance of a spherically diverging wave front; where the curvature is sufficiently pronounced to cause substantial errors in resulting measurements in the calculations. The processing uses information contained within the vector sensor data to increase the accuracy of the vector sensor data. Thus, there is provided a processor for calibrating acoustic vector sensor data collected at close range (as well other ranges).

The above and other features of the invention, including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Other objects, features and advantages of the present invention will be apparent with reference to accompanying drawings in which is shown an illustrative embodiment of the invention, wherein corresponding reference characters indicate corresponding parts throughout the several views of the drawings and wherein.

DETAILED DESCRIPTION OF THE INVENTION

Figure 1:
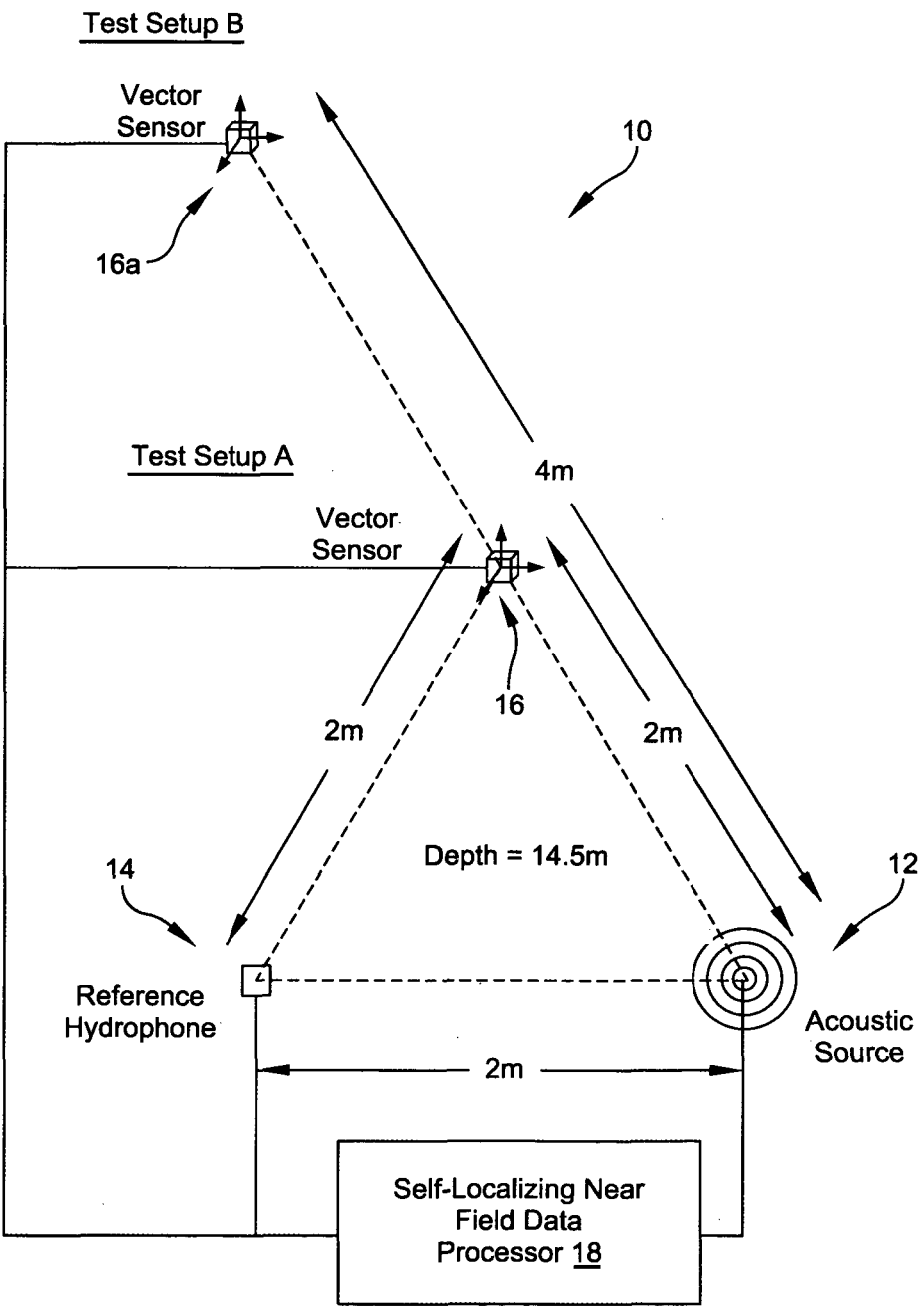
FIG. 1 is a diagram of a system implementing one embodiment of the present invention.

Referring now to the drawings, and more particularly to FIG. 1, a diagram of a test system is illustrated and referenced by numeral 10. The test system 10 includes an acoustic source 12 for providing a source of propagated acoustic waves. Reference hydrophone 14 is arranged having a source-to-receiver distance of approximately two to four meters. Both the acoustic source 12 and the reference hydrophone 14 are submerged at an example depth of approximately 14.5 meters.

Vector sensor 16 is, for example, an acoustic vector sensor module (unit under test) that is arranged in Test Setup A at a first location that is approximately two meters from both the acoustic source 12 and the reference hydrophone 14; thus forming an equilateral triangle with each side being two meters in length. Vector sensor 16a is arranged in Test Setup B at a second location that is approximately two meters from the vector sensor 16 and four meters from the acoustic source 12. The vector sensor 16a in various embodiments may be the vector sensor 16 moved to a new location or may be a different vector sensor, such as a vector sensor arranged with other vector sensors in a towed sensor array.

Self-localizing near field data processor 18 is arranged to receive a reference sample set of collected data from the reference hydrophone 14 and is arranged to receive a sensor sample set of collected data from the vector sensor 16 (and optionally the vector sensor 16a). The near field data processor 18 is also arranged to determine a range difference error in response to a comparison of the reference sample set of collected data and the sensor sample set of collected data. The near field data processor 18 uses the range difference error to correct at least partially an estimated range of the source-to-sensor distance. Thus, FIG. 1 describes an example data collection geometry used to calibrate equipment that includes the vector sensors 16 and 16*a*.

The relative positions of one or more acoustic sources (e.g., the acoustic source 12), one or more reference hydrophones (e.g., the reference hydrophone 14), and one or more vector sensors (e.g., the vector sensors 16 and 16*a*) in the illustrated data collection geometry are variable in accordance with the teachings disclosed herein. For example, the data collection geometry can be used to test performance of a towed array of acoustic vector sensors that arranged using a variety of materials and manufacturing approaches. As discussed below, the performance of a given configuration is determined using the complex sensitivity of the scalar and vector channels of acoustic vector sensors installed in the test system 10.

Calibration waveforms used for these experiments typically include gated, continuous wave signals ranging from 100 to 1000 Hz. Nominal pulse widths range from 35 to 50 milliseconds. Typical pulse repetition frequencies (PRF) are often approximately two to four Hertz. The sensor module is typically rotated through a full rotation to fully sample the dipole response pattern of the vector channel and to determine the orientation. Calibration wave forms are thus transmitted throughout a portion or all of a rotation of a vector sensor. Data is collected throughout the rotation.

A typical objective of each test is to collect data in an acoustic near field that is used to compute the frequency-dependent, complex sensitivity of the scalar and vector sensor data channels for a given configuration. The complex sensitivity is computed using acoustic (scalar pressure) and vector (acceleration) channels in an acoustic vector sensor that provide data collected in the acoustic near field. As used herein, an acoustic near field exists at source-to-receiver separations that are sufficiently short such that the specific acoustic impedance of the wave front is not well-approximated by the plane wave impedance. Thus, analyses of data collected in the near-field may show inconsistencies when compared against analyses of data collected having physically (and accurately) measured geometries.

Calibration calculations that depend on data collected in the near field are often sensitive to range measurement errors in the acoustic near field because a given error in the measured source-to-receiver range produces an error in the computed sensitivity magnitude that varies as a function of the inverse of the absolute source-to-receiver range. The impact of range measurement errors are thus magnified in the acoustic near field.

Calibration calculations that depend on data collected in the near field are also often sensitive to range measurement errors in the acoustic near field because the specific acoustic impedance is a strong function of the wave number-range product (kr) in the acoustic near field. As a result, calculation of the reference vector field quantities based on scalar reference measurement (e.g., using a reference hydrophone) is normally critically dependent on having an accurate physical measurement of the source-to-receiver ranges. The dependencies are especially critical when the imaginary part of the complex acceleration sensitivity (e.g., phase response) is used where the specific acoustic impedance varies rapidly as a function of the wave number-range product (kr).

Conventional methods for the calibration of acoustic vector sensor towed arrays have operated on data collected at nominal source-to-receiver separations of approximately fifty meters. At these ranges the specific acoustic impedance of the field produced by a compact acoustic source at intermediate frequencies ($100 \leq f \leq 1000$ Hz) is well-approximated by the plane wave impedance. Typical wave number-range products (kr) for these tests have a range from 30 to 440. However, array calibrations conducted using these methods show that the vector channels of point sensors include an erroneous phase response characteristic that is not consistent with the phase of the incident acoustic vector field. Subsequent developmental testing on short sensor modules (which is representative of typical towed arrays arranged using given techniques) can be conducted at source-to-receiver separations of two to four meters. At these ranges and frequencies ($0.85 \leq kr \leq 15$); the acoustic field is not well-approximated using plane wave modeling.

Calibration calculations are disclosed herein for processing acoustic vector sensor data collected at close range. In an embodiment, vector sensor data collected at close range includes data collected with source-to-receiver separations ranging from one-tenth to approximately two acoustic wavelengths. Thus, calculations are disclosed (that are suitable for the calibration of test articles), substantially account for the acoustic impedance of a spherically diverging wave front, where the curvature is sufficiently pronounced to cause substantial errors in resulting measurements in the calculations. The calculations in the disclosed embodiment assume that the aperture of the acoustic source is compact with respect to an acoustic wavelength produced by the acoustic source.

The acoustic field generated by a compact acoustic source includes a scalar field. The scalar field presented to the reference hydrophone and the vector sensor is represented using Equation [1], (in which the assumed harmonic time dependence has been suppressed):

$$P_{ref} = \frac{P_o}{r_{ref}} e^{-jkr_{ref}} \text{ and } P_{uut} = \frac{P_o}{r_{uut}} e^{-jkr_{uut}} \quad [1]$$

where:
$P_{ref}$ is the acoustic pressure at the reference hydrophone;
$P_{uut}$ is the acoustic pressure at the unit under test;
$P_o$ is the acoustic pressure at a reference distance from the source;
$r_{ref}$ is the source-to-reference hydrophone range;
$r_{uut}$ is the source-to-unit under test range (acoustic vector sensor); and
k is the acoustic wave number.

The complex pressure sensitivity of the reference hydrophone and the vector sensor are represented as the ratio of the voltage output by the sensor to the acoustic pressure at the sensor (Equation [2]):

$$M_{ref} = \frac{v_{ref}}{P_{ref}} \text{ and } M_{uut_0} = \frac{v_{uut_0}}{P_{uut}} \quad [2]$$

where:
$M_{ref}$ is the complex sensitivity of the reference hydrophone;
$M_{uut_0}$ is the complex sensitivity of the vector sensor scalar (hydrophone) channel, in which the sensitivity and voltage for the scalar channel of the vector sensor (hydrophone) is indicated with the subscript "0" to identify the measured field variable as a tensor of order zero;

$v_{ref}$ is the complex voltage measured on the reference hydrophone; and $v_{uut_0}$ is the complex voltage measured on the vector sensor scalar.

Combining Equations [1] and [2] provides the complex sensitivity of the vector sensor hydrophone (e.g. the scalar channel) provided as Equation [3].

$$M_{uut_0} = M_{ref} \frac{v_{uut_0} r_{uut}}{v_{ref} r_{ref}} e^{jk(r_{uut}-r_{ref})} \quad [3]$$

The complex exponential of Equation [3] compensates for the phase between the reference and the vector sensor hydrophone when the source-to-receiver paths are unequal. Given the maturity and long experience in using hydrophones and hydrophone-based arrays; the imaginary parts (phase angles) of the sensitivities can be expected to be relatively small.

Moving from determining complex pressure sensitivity to determining complex acceleration sensitivity; the complex sensitivity of a vector channel is represented as the ratio of voltage output by the sensor to the measured field variable, which in this case is the acoustic particle acceleration shown in $$M_{uut_1} = \frac{v_{uut_1}}{a_{uut}}, \quad [4]$$

where:

$M_{uut_1}$ is the complex sensitivity of the vector, in which the quantities are annotated with the subscript "1" below to identify the measured field variable as a tensor of order one;

$V_{uut_1}$ is the voltage measured on a vector sensor channel (acceleration); and $a_{uut}$ is the incident acoustic particle acceleration $$\frac{\partial u}{\partial t}.$$

In contrast to the equations provided for the hydrophone channels, Euler's momentum equation is used to determine the acoustic particle acceleration from the gradient of the acoustic pressure (shown as Equation [5]), where μ is the fluid density:

$$\frac{\partial u}{\partial t} = \frac{-1}{\rho} \nabla p \quad [5]$$

The compact sound source (discussed above) is assumed to produce an acoustic wave spreading spherically (from a relatively compact aperture) into free space (e.g., a practically infinite medium). The validity of the assumed infinite medium is verified by gating the received calibration waveforms to ensure exclusion of reflections from the water surface and other boundaries (such as test equipment, test tank, and the like).

The spherical wave is described using a standard spherical coordinate system. In spherical coordinates, the acoustic field produced by a compact source in free space normally depends only on range. Thus, terms for the angular components of the gradient (shown in Equation [6]) vanish:

$$\nabla p = \frac{\partial p}{\partial r}\hat{r} + \frac{1}{r}\frac{\partial p}{\partial \theta}\hat{\theta} + \frac{1}{r\sin\theta}\frac{\partial p}{\partial \phi}\hat{\phi} \quad [6]$$

where $\hat{r}, \hat{\theta}, \hat{\phi}$ are unit vectors in standard spherical coordinates; and r, θ, φ are displacements in their respective coordinate directions.

Combining the gradient of Equation [1] with Equation [5] forms Equation [7], which depicts the radial component of the acoustic vector field at a point related to the scalar field. As discussed above, the angular components of the vector field vanish when a compact source in free space is used.

$$\frac{\partial u}{\partial t} = \frac{k}{\rho}\left(\frac{1}{kr} + j\right)p \quad [7]$$

Accordingly, combining Equations [1], [2], [4] and [7] yields an expression for determining the complex sensitivity of an acoustic accelerometer at a first location (e.g., the acoustic vector sensor); using the acoustic pressure measure at a different location (e.g., the reference hydrophone) as the reference. The expression for determining the complex sensitivity of an acoustic accelerometer at one location is given as Equation [8]:

$$M_{uut_1} = M_{ref} \frac{v_{uut_1} r_{uut}}{v_{ref} r_{ref}} \frac{\rho}{k}\left(\frac{kr_{uut}}{1+jkr_{uut}}\right) e^{jk(r_{uut}-r_{ref})} \quad [8]$$

Calculation of the complex pressure sensitivity depends on accurate knowledge of the ranges of the source-to-reference and the source-to-unit under test. For Equations [3] and [8] to produce valid results in a near field; the ranges need to be known with sufficient precision. However, in many test situations, it is difficult to determine and/or control the ranges with the precision required to prevent the propagation of errors into the amplitude and phase of the complex sensitivities for both the scalar and vector channels.

For example, errors in the reported ranges have been manifested as a phase difference of a signal that is received by both the reference and vector sensor hydrophones when both the reference and vector sensor hydrophones were reported to have been at equal distances from the source (which ideally does not have a phase difference). The error in phase tends to be manifest as a linear trend as illustrated in FIG. 2.

Figure 2:
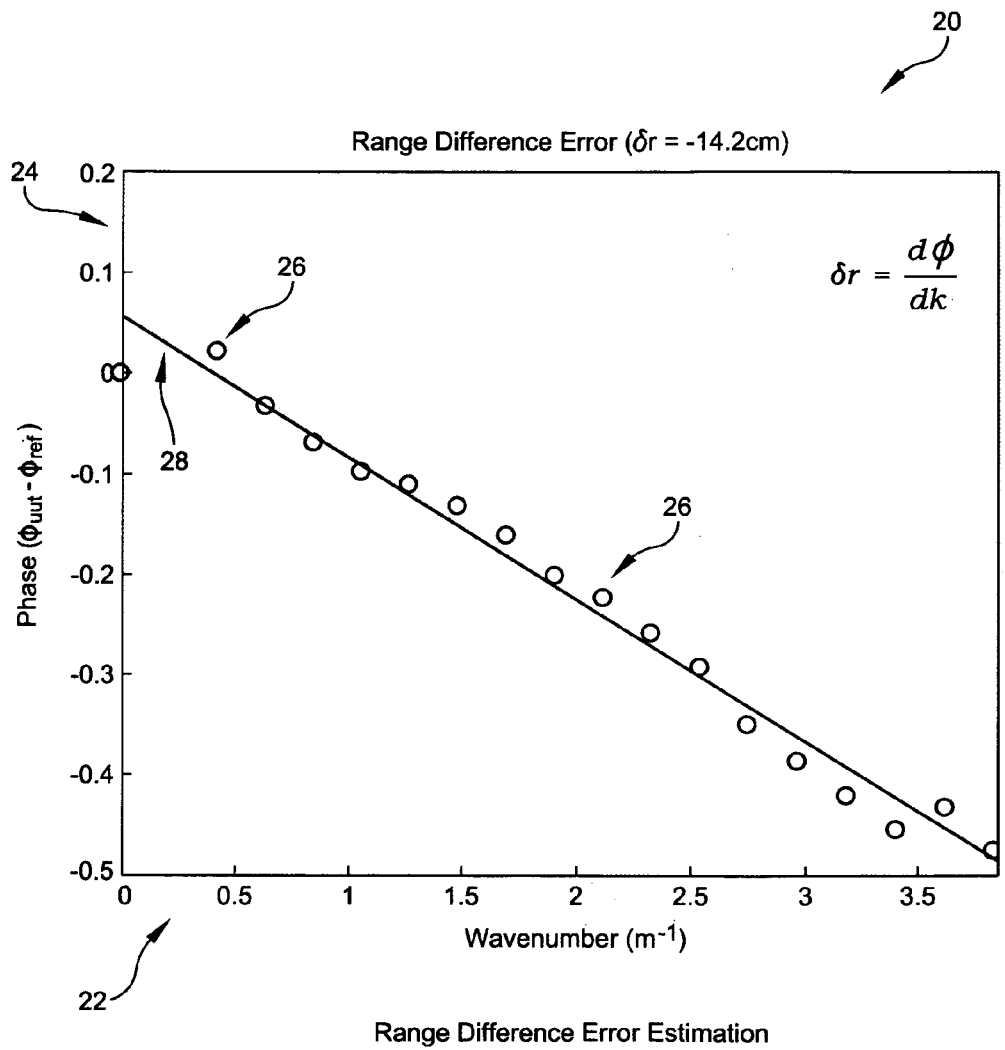
FIG. 2 is a graph illustrating range difference error estimation in an embodiment of the present invention.

FIG. 2 is a plot showing a phase error of the reception of a signal between a vector sensor hydrophone and a reference hydrophone that are not both the same range (e.g., distance) from the source of the signal. Plot 20 includes a horizontal axis 22 and a vertical axis 24. Horizontal axis 22 represents a wavenumber k (in inverse meters); whereas, the vertical axis 24 represents a measured difference in phase between the reception of a signal between a vector sensor hydrophone and a reference hydrophone. Samples 26 (designated generally with small circles) are illustrated as the phase difference as a function of the wavenumber. Line 28 is a linear approximation of the set of the observed samples 26 and has slope δr of −14.2 cm.

The observed linear trend in phase (illustrated by line 28) is largely the result of a time delay between receptions of the signal at locations having different distances. Given that these signals were collected at nearly the same time (e.g., samplefor-sample), a likely explanation of the delay is there being differing lengths of propagation of the signal paths. Thus, the phase error occurs because the actual distances involved were different than the reported (e.g., expected) geometry of the test setup.

Figure 3:
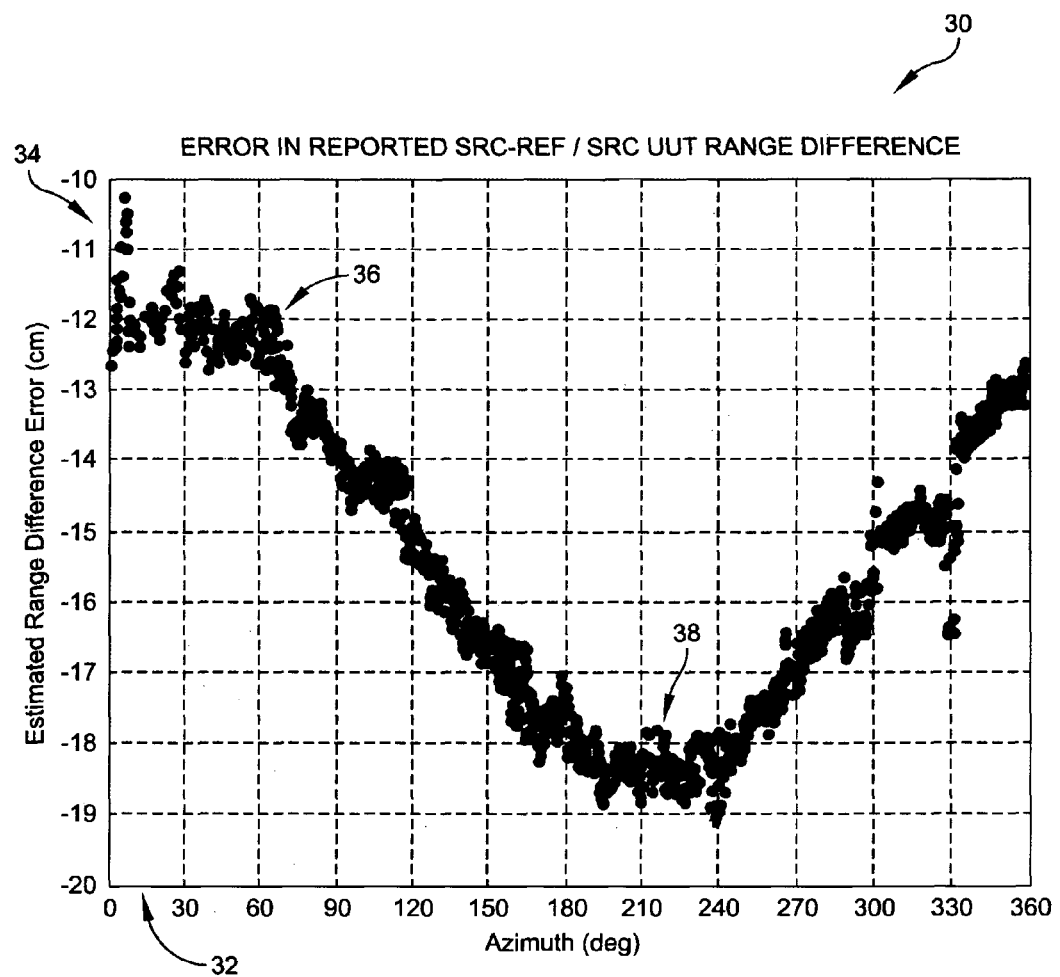
FIG. 3 is a graph illustrating range difference error in data to be processed by an embodiment of the present invention.

FIG. 3 is a plot showing an estimated range difference error of the reception of a signal as a vector sensor module is rotated using a test fixture. Plot 30 includes a horizontal axis 32 and a vertical axis 34. The horizontal axis 32 represents an azimuth, whereas the vertical axis 34 represents an estimated range difference between the vector sensor and the reference hydrophones. Samples 36 (designated generally with solid dots) are illustrated as the range difference as a function of the azimuth of a test-fixture support pole that is rotated to change the orientation of the vector sensor during testing. For example, the sample 38 of the set of observed samples indicates an average range difference of approximately −18.5 cm at an azimuth of approximately 220 degrees.

Thus, the estimated range difference error varies over the course of one full revolution of the pole to which the vector sensor module was mounted. A peak-to-peak range variation of approximately seven centimeters is observed for the set of the samples 36 over one revolution. For the depiction of FIG. 3, the support pole from which the vector sensor module was deployed was found during post-test inspection to be bent (thus causing translation of the vector sensor during rotation of the pole). Accordingly, the bent pole contributed to the observed variation in range as the vector sensor module was rotated through one full revolution (e.g., 360 degrees).

While the data support estimation of range difference errors, the data does not directly provide information about the extent to which the error may have been due to placement of the source, the reference or the unit under test. Also, the wave impedance is a strong function of range in the acoustic near field (as shown with reference to FIG. 4).

Figure 4:
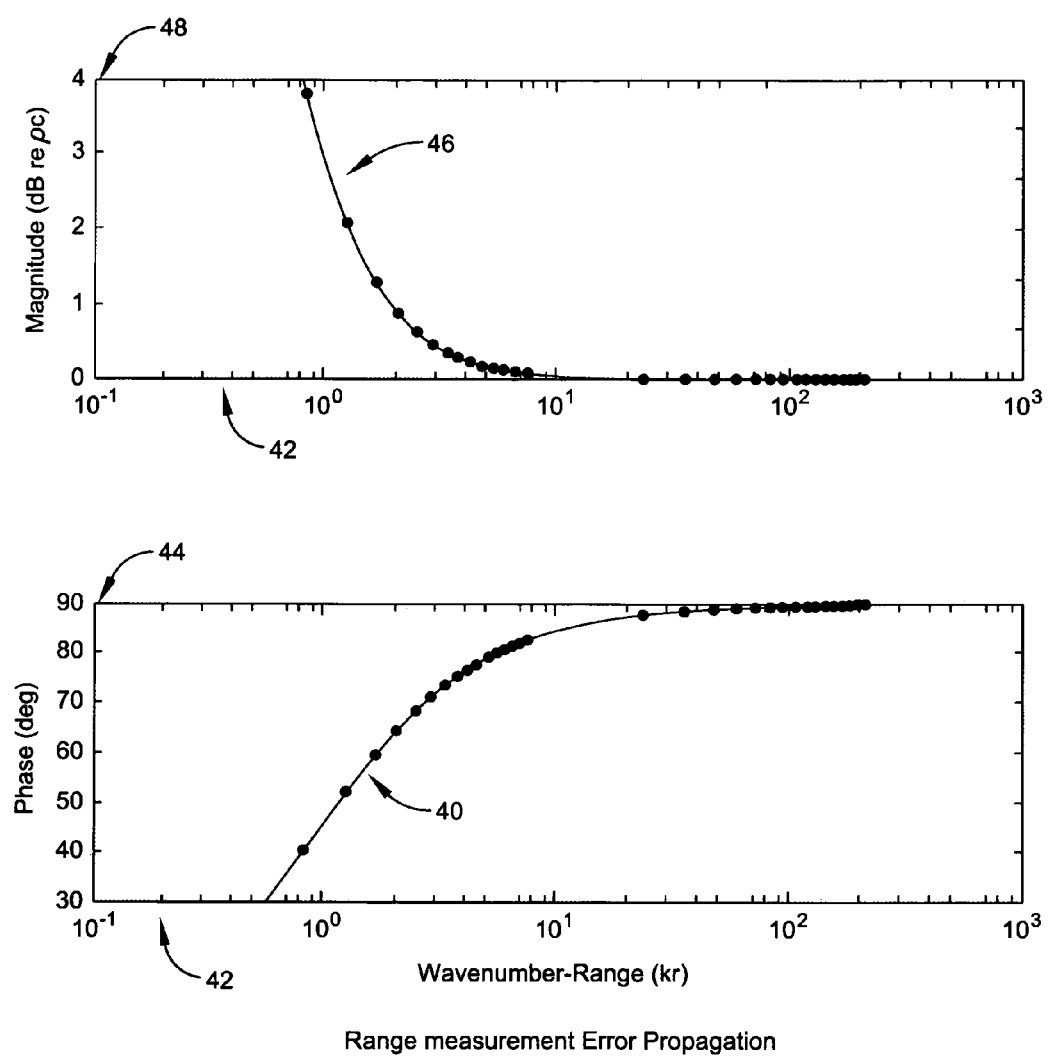
FIG. 4 is a graph illustrating range measurement error propagation in data to be processed in accordance with the present invention.

FIG. 4 is a plot showing range measurement propagation errors in phase and magnitude. Curve 40 (interpolated from sampled data from various test ranges having differing minimum and maximum ranges) represents phase errors of wave impedance relative to a plane travelling wave as plotted in accordance with a horizontal axis 42 (wavenumber-range: kr) and a vertical axis 44 (phase error in degrees). Curve 46 (interpolated from sampled data) represents magnitude errors of wave impedance relative to the plane travelling wave as plotted in accordance with the horizontal axis 42 and a vertical axis 48 (magnitude error in decibels). The curves 40 and 46 demonstrate substantial errors in phase and magnitude, respectively, in near field measurements (e.g., around wavenumber-ranges of ten or less), with the magnitude of the errors increasing exponentially as the wavenumber-range approaches zero. Thus, accurate source-receiver separations are useful in preventing the propagation of significant errors to the complex acceleration sensitivity. Also, the disclosed techniques can still be used to increase accuracy of data sampled at a near field "boundary" and locations beyond (albeit with the improvement in accuracy decreasing with an increase in distance).

In accordance with the present disclosure, range measurement errors in the acoustic near field are detected, estimated and corrected. The calibration equations, Equation [3] and [8], are modified to include corrections to the source-to-reference and/or source-to-unit under test ranges. The modified equations (the complex pressure sensitivity and complex acceleration sensitivity) are provided as Equation [9] and [10] respectively. The modifications include a first term for correcting the estimated range difference error ($\delta r$) and a second term ($\eta$) to control how that error is apportioned between the source-to-reference and source-to-unit under test ranges.

$$M_{uut_0} = M_{ref} \frac{v_{uut_0}}{v_{ref}} \frac{r_{uut} + \eta \delta r}{r_{ref} + (\eta - 1)\delta r} e^{jk(r_{uut} - r_{ref} - \delta r)} \quad [9]$$

$$M_{uut_1} = \quad [10]$$
$$M_{ref} \frac{v_{uut_1}}{v_{ref}} \frac{r_{uut} + \eta \delta r}{r_{ref} + (\eta - 1)\delta r} \frac{\rho}{k} \left( \frac{k(r_{uut} + \eta \delta r)}{1 + jk(r_{uut} + \eta \delta r)} \right) e^{jk(r_{uut} - r_{ref} - \delta r)}$$

where:
$\delta r$ is the range difference error; and
$\eta$ is a control parameter ($0 \le \eta \le 1$).

Selection of the parameter ($\eta$) allows for control of the way that range difference error is allocated. For example, setting $\eta=1$ allocates the error to the source-to-unit under test range. Setting $\eta=0$ allocates the error to the source-to-reference hydrophone range. Allocation of the error equally between the two may be implemented by setting $\eta=\frac{1}{2}$.

The use of $\eta$ allows experimental conditions to be taken into account. For example, the locations of the source and reference hydrophone can be controlled by a permanent fixture. In addition, the mean range difference error can be observed to change between data collection runs when the unit under test is removed, modified and reinstalled. The time-varying part of the range difference error is correlated to the rotation of the unit under test about its longitudinal axis of the unit. Therefore, it can be concluded that the range difference errors are due to the placement and manipulation of the unit under test. As a result, the control parameter $\eta$ can be set to allocate the difference error to the unit under test ($\eta=1$).

Figure 5:
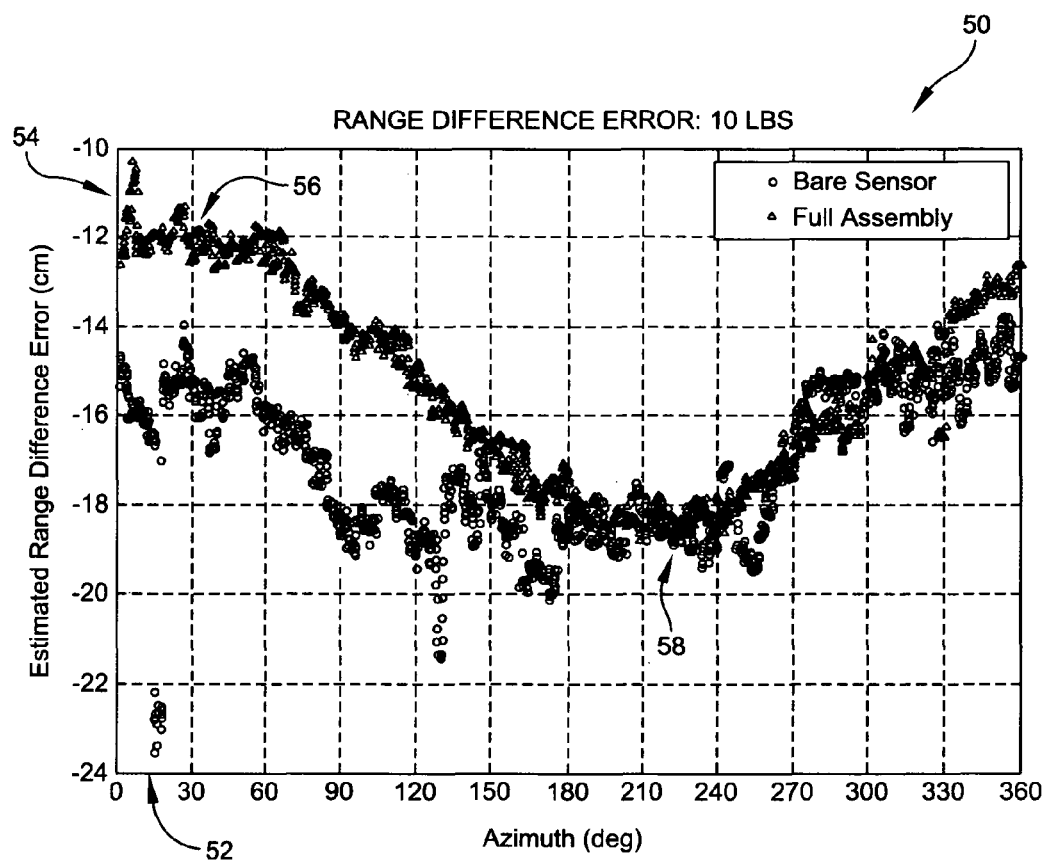
FIG. 5 is another graph illustrating range difference error estimation in an embodiment of the present invention.

FIG. 5 is a diagram illustrating-estimated range error in accordance with differing measuring techniques (e.g., bare sensor versus full assembly sensors). In fashion similar to FIG. 3; FIG. 5 illustrates estimated range errors of the reception of a signal as a vector sensor module is rotated (e.g., reoriented) using a test fixture. Plot 50 includes a horizontal axis 52 and a vertical axis 54. The horizontal axis 52 represents an azimuth (of the vector sensor module hydrophone orientation) whereas the vertical axis 54 represents an estimated range difference between the vector sensor module and the reference hydrophones. Samples 56 (designated generally with a circular icon for samples obtained using a bare sensor, and a triangular icon for samples obtain using a full assembly) are illustrated as the range difference as a function of the azimuth of a pole that is rotated to change the orientation of the vector sensor during testing. For example, sample 58 of the set of the observed samples 56 indicates an average range difference of −18.5 centimeter at an azimuth of approximately 220 degrees.

The collected data illustrated in the plot 50 is subsequently processed using the calibration equations disclosed in Equations [9] and [10].

The methods described herein can be used to track the range measurement error on a "ping-by-ping" basis. That is, for each gated acoustic signal, a range measurement error can be determined for each of the sensors used to receive the gated acoustic signal. Thus, for a given data set, range difference errors are used to compute the range correction term ($\delta r$) for the calibration equations for each sensor. The range difference errors can also be selectively allocated to the test fixture and/or the unit under test (by using the control parameter $\eta$). Calibration results for the scalar measurements and one vector channel are illustrated in FIG. 6 and FIG. 7.

Figure 6:
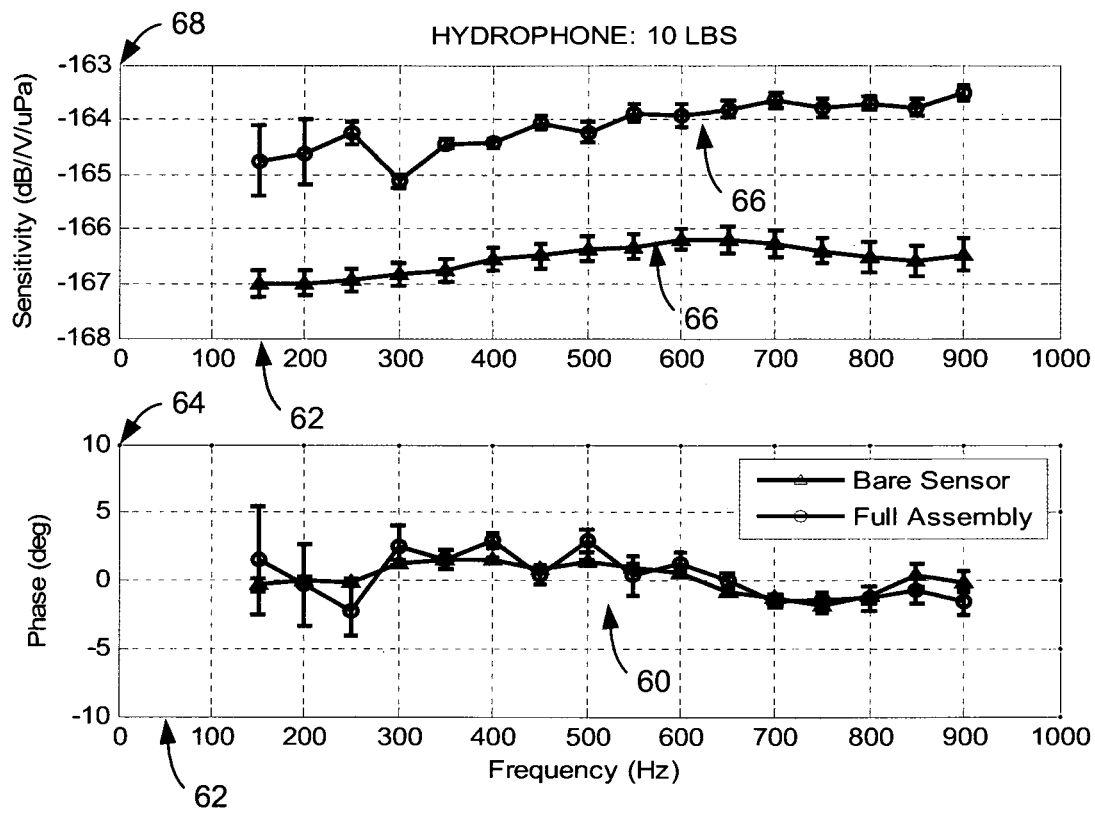
FIG. 6 is a graph illustrating range difference error estimation corrections in an embodiment of the present invention.

FIG. 6 is a plot illustrating sensitivity and phase errors of hydrophone data processed using the self-localization methods and system in accordance with the invention. Curve 60 (interpolated from sampled data points) represents phase errors of wave impedance relative to a gated acoustic signal as plotted in accordance with a horizontal axis 62 (frequency in Hertz) and a vertical axis 64 (phase error in degrees). Curve 66 (interpolated from sampled data) represents hydrophone sensitivity to the gated acoustic signal as plotted in accordance with the horizontal axis 62 and a vertical axis 68 (magnitude error in decibels, volts, microPascals, and the like). The curves 60 and 66 demonstrate substantial correction of errors in phase and magnitude; respectively, to data collected in near field measurements (e.g., around wavenumber-ranges of ten or less).

Figure 7:
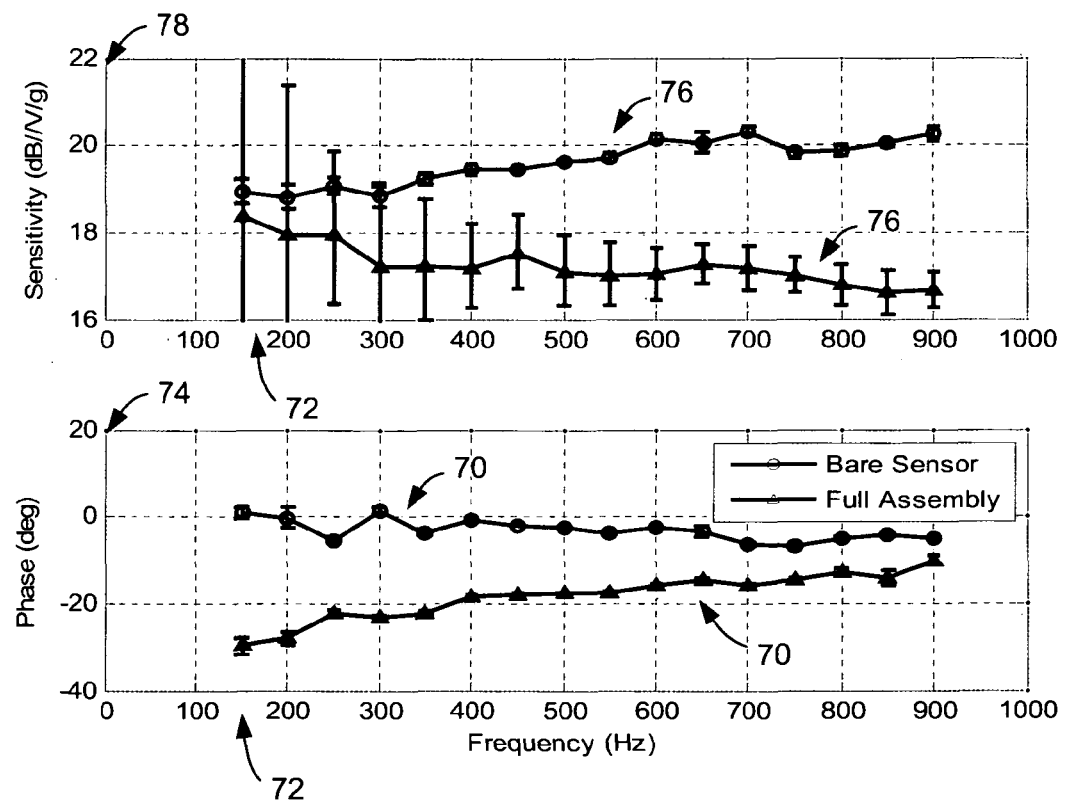
FIG. 7 is another diagram illustrating range difference error estimation corrections in an embodiment of the present invention.

FIG. 7 is a plot illustrating sensitivity and phase errors of unit under test data processed using the self-localization methods and system in accordance with the invention. Curve 70 (interpolated from sampled data points) represents phase errors of wave impedance relative to a gated acoustic signal as plotted in accordance with a horizontal axis 72 (frequency in Hertz) and a vertical axis 74 (phase error in degrees). Curve 76 (interpolated from sampled data) represents unit under test sensitivity to the gated acoustic signal as plotted in accordance with the horizontal axis 72 and a vertical axis 78 (magnitude error in decibels, volts, microPascals, and the like). Curves 70 and 76 demonstrate substantial correction of errors in phase and magnitude, respectively, to data collected in near field measurements (e.g., around wavenumber-ranges of 10 or less).

The error bars in FIG. 6 and FIG. 7 represent plus and minus one standard deviation in the estimated parameter. As shown by the curve 60, the hydrophone phase error is nearly zero (as was indicated in the derivation of the range error difference error correction given above). In an embodiment, the linear phase between the reference and unit under test hydrophones was assumed to result from time delay/propagation path length differences. The remaining (non-linear) phase difference was allocated to the unit under test (using parameter η).

In various embodiments of the invention, accurately measured distances between the source-to-reference and source-to-unit under test are used to verify range corrections (based on self-localizing methods and systems disclosed herein) of acoustic data.

For example, one embodiment uses the self-localizing disclosed herein while performing the data collection task in the acoustic near field relates to the requirement to collect data that is free of surface reflections. A method of increasing the time between the initial arrival of a calibration waveform, and the arrival of the surface reflection is to increase the depth at which the test is conducted while simultaneously decreasing the source-to-receiver range. Therefore, even in a large body of water (which generally entails additional expense over smaller test facilities) that can support data collection in the acoustic far field, it may be desirable to work in the near field in order to maximize the collection of data that adequately approximates free field propagation conditions.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for calibrating a plurality of data channels in an acoustic vector sensor for simultaneously measuring acoustic pressure and particle motion in at least one direction in a point in space, said method comprising the steps of:

providing a field data processor;

receiving with the data processor, a reference sample set of collected data from a reference hydrophone that is arranged having a source-to-reference distance along a first direction wherein the reference sample set of collected data is produced by sampling an acoustic signal representing the acoustic pressure generated by the acoustic source;

receiving with the data processor, a sensor sample set of collected data from the vector sensor that is arranged having an acoustic source-to-sensor distance along a second direction that is different from the first direction wherein the sensor sample set of collected data is produced by sampling acoustic signals representing the acoustic pressure and particle motion generated by the acoustic source;

determining a range difference error in response to a comparison of the reference sample set of collected data and the sensor sample set of collected data of the vector sensor;

correcting at least partially an estimated range difference error;

correcting at least partially the acoustic pressure observed at the vector sensor; and correcting at least partially the particle motion observed at the vector sensor;

wherein the vector sensor is calibrated based on said correcting steps.

2. The method in accordance with claim 1, wherein the source-to-sensor distance is corrected using a complex pressure sensitivity determined in accordance with the equation $$M_{uut_0} = M_{ref} \frac{v_{uut_0}}{v_{ref}} \frac{r_{uut} + \eta \delta r}{r_{ref} + (\eta - 1)\delta r} e^{jk(r_{uut} - r_{ref} - \delta r)}$$

where $M_{uut_0}$ is the complex sensitivity of the acoustic sensor, $M_{ref}$ is the complex sensitivity of the reference hydrophone, $v_{uut_0}$ is the complex voltage measured on the acoustic sensor, $v_{ref}$ is the complex voltage measured on the reference hydrophone, k is the wave number, $r_{uut}$ is the source-to-sensor distance, $r_{ref}$ is the source-to-reference distance, and δr is the range difference error.

3. The method in accordance with claim 1 wherein phases of complex sensitivities are computed using a nominal distance from the acoustic source to the reference hydrophone $r_{ref}$, a nominal distance from the acoustic source to the vector sensor $r_{uut}$, a range difference error δr, and a acoustic wave number k=2πf/C where sound speed C is provided by an independent measurement to arbitrary precision.

* * * * *